United States Patent [19]

Noble

[11] 4,184,995

[45] Jan. 22, 1980

[54] FLAME INSULATIVE SILICONE COMPOSITIONS

[75] Inventor: Maynard G. Noble, Troy, N.Y.

[73] Assignee: General Electric Company, Waterford, N.Y.

[21] Appl. No.: 739,162

[22] Filed: Nov. 5, 1976

[51] Int. Cl.² ............................................. C08L 83/04
[52] U.S. Cl. ........................ 260/37 SB; 260/DIG. 24
[58] Field of Search .................... 260/37 SB, DIG. 24

[56] References Cited

U.S. PATENT DOCUMENTS

| | | | |
|---|---|---|---|
| 3,114,840 | 12/1963 | Johnston | 260/37 X |
| 3,154,515 | 10/1964 | Berridge | 260/37 SB X |
| 3,296,161 | 1/1967 | Kulpa | 260/37 SB X |
| 3,630,764 | 12/1971 | Shannon | 260/DIG. 24 |
| 3,855,171 | 12/1974 | Wegehaupt et al. | 260/37 SB |
| 3,922,246 | 11/1975 | Ceyzeriat et al. | 260/37 SB |

*Primary Examiner*—Lewis T. Jacobs
*Attorney, Agent, or Firm*—John L. Young; E. Philip Koltos; Philip L. Schlamp

[57] ABSTRACT

A flame insulative heat vulcanizable silicone rubber composition or two-part room temperature vulcanizable silicone rubber composition comprising or having the standard ingredients of such compositions in which the flame insulative additive consists of, in addition to the inert filler, from 25 to 150 parts by weight of ground glass and more preferably, glass frits. In a more preferable embodiment, in addition to the ground glass, there is utilized from 5 to 50 parts of glass fibers and more preferably, milled glass fibers having an average size varying anywhere from 0.01 to 0.5 inches.

9 Claims, No Drawings

FLAME INSULATIVE SILICONE COMPOSITIONS

BACKGROUND OF THE INVENTION

The present invention relates to a flame insulative heat vulcanizable silicone rubber composition and flame insulative two-part room temperature vulcanizable silicone rubber composition and more particularly the present invention relates to such compositions having in them as the flame insulative additive from 25 to 150 parts of ground glass and more preferably, glass frits.

Heat vulcanizable silicone rubber compositions are well known. Such compositions usually consist of a linear diorganopolysiloxane polymer of 1,000,000 to 200,000,000 cps. viscosity at 25° C., an inert filler which is usually selected from the reinforcing fillers such as, fumed silica and precipitated silica and also may contain to some extent extending fillers such as, quartz or zinc oxide. To such a mixture there is normally added a peroxide curing catalyst which cures the composition at elevated temperatures to form a silicone elastomer. In the past such heat vulcanizable silicone rubber compositions were utilized to insulate wires and cables of various kinds so as to protect or maintain the electrical integrity of the conducting wires or cables during a fire, that is, such heat vulcanizable silicone rubber compositions were found to be highly desirable as insulators for electrical wires and cables. Such silicone materials tended to resist burning better than organic materials and organic polymers. Such heat vulcanizable silicone rubber compositions even when burning leave a white ash which if kept in place would protect to a certain extent the underlying wires or cables from further burning and would tend to prolong the maintaining of the electrical integrity of the conducting wire or cable. In addition, there have been various modifications in which such heat vulcanizable silicone rubber compositions were made even more resistant to burning by the addition of small amounts of platinum alone or with carbon black as, for instance, disclosed in the Noble/Brower, U.S. Pat. No. 3,514,424. One difficulty with such flame insulative heat vulcanizable silicone rubber compositions was that the silicone elastomer that was formed would still, upon burning at highly elevated temperatures, form a white ash that was easily displaced from its place by gaseous by-products that were formed during the combustion process, and by physical vibration of the burned cable. Accordingly, it was felt highly desirable to develop a flame insulative heat vulcanizable silicone rubber composition which, upon burning, would form a white ash that maintained its physical integrity around the cable so as to form a barrier between the flame and the wire that was being protected so as to provide further flame protection capabilities to the wire that was enclosed by such heat vulcanizable silicone rubber composition. Other attempts have been made to keep the white ash that is formed when the silicone elastomer was burned in place such as, use of glass braids around the silicone elastomer. However, with the use of such glass braids, the resultant cable was bulky and hard to work with in the construction and installation of electrical systems.

The approach for the protection of such electrical conducting wires or cables when there was utilized a two-part room temperature vulcanizable silicone rubber composition as a sealant that was cured in place upon mixing the two parts and forcing the material in the cavities in the cable and allowing the composition to cure to a silicone elastomer, was such that the silicone material was kept in place during the burning process by the configuration and shapes that it took as it filled the voids of the electrical cables. The use of such a room temperature vulcanizable silicone rubber composition and in such a use is known to the industry as a valley sealant. It was common when such room temperature vulcanizable silicone rubber compositions were utilized as valley sealants that jackets were inserted thereover, as an additional means for keeping the white ash that was formed from the burning silicone elastomer in place. However, as stated previously, the jackets burned even more rapidly than the silicone elastomer and, thus, were not very effective, such that the valley sealant, upon burning, formed a white ash and such white ash still tended to be moved in its position by the gases that escaped and that were formed by the burning of the silicone elastomer. Accordingly, it was highly desirable for such two-part room temperature vulcanizable silicone rubber compositions that were used as valley sealants to have added to them additives that would maintain their integrity and result in the white ash that was formed from the burning of the silicone elastomer being cohesive so that the white ash of the burned silicone elastomer would remain in place and act as a barrier between the flame and the electrical conducting wires that were being protected by such room temperature vulcanizable silicone rubber composition. It should also be noted that the use of platinum as well as carbon black and various other additives to two-part room temperature vulcanizable silicone rubber compositions, while increasing to some extent the flame insulativeness did not perform any function as far as allowing the cured silicone elastomer that was burned into a white ash to maintain its integrity.

Accordingly, it is one object of the present invention to provide for an improved heat vulcanizable silicone rubber composition which has improved flame insulative properties by utilizing in the composition the necessary amount of ground glass and more specifically glass frits so that the silicone composition after it has burned to a white ash will still maintain its integrity.

It is another object of the present invention to provide for a process for producing the heat vulcanizable silicone rubber composition with improved flame insulative properties by the utilizing in such process ground glass or glass frits such that the composition after burning to a white ash still maintains its integrity.

It is an additional object of the present invention to provide for a two-part room temperature vulcanizable silicone rubber composition with improved flame insulative properties which by the use of ground glass or glass frits in the composition results in the composition maintaining its integrity upon burning.

It is yet an additional object of this invention to provide for an improved process for producing a two-part room temperature vulcanizable silicone rubber composition with improved flame insulative properties which by the addition of ground glass or glass frits in the composition results in the composition maintaining its integrity.

These and other objects of the present invention are accomplished by means of the disclosure set forth herein below.

SUMMARY OF THE INVENTION

In accordance with the above objects there is provided by the present invention a flame insulative heat vulcanizable silicone rubber composition comprising (a) 100 parts by weight of a linear diorganopolysiloxane polymer of a viscosity ranging from 1,000,000 to 200,000,000 centipoise at 25° C. with organic groups selected from monovalent hydrocarbon radicals and halogenated monovalent hydrocarbon radicals, (b) from 50 to 300 parts by weight of an inert filler which preferably is selected from fumed silica and precipitated silica, and (c) from 25 to 150 parts by weight of ground glass. Preferably this composition which may be used in both the uncured and the cured state contains from 0.1 to 10 parts by weight of a peroxide curing catalyst and the composition is formed into a silicone elastomer by heating the above ingredients, alone or with additives, at elevated temperatures of about above 100° C. for a period of 1 hour to 8 hours to form a flame insulative silicone elastomer. More specifically, there is desired for utilization in the instant invention 25 to 150 parts by weight of ground glass known as glass frits, which is a ground glass having a size of anywhere from 50 to 400 microns and having a melting point between 1000° to 1400° F. Preferably it is only this type of ground glass or glass frits that can be utilized as the basic flame insulative additive in the compositions of the instant case.

In a more preferred embodiment there is utilized as an additional flame insulative additive so as to allow the composition, upon burning to a white ash, to maintain its integrity, glass fibers at a concentrated of from 5 to 30 parts. The most preferred glass fibers that are utilized as an additional flame insulative additive in the composition of the instant case are milled glass fibers having the average size ranging from 0.01 to 1 inch in length and, more preferably, having an average size of anywhere from 0.01 to 0.5 inches in length.

There is also provided by the instant invention a two-part room temperature vulcanizable silicone rubber composition comprising (a) 100 parts by weight of a silanol end-stopped diorganosiloxane having a viscosity varying from 1000 to 200,000 centipoise at 25° C. (b) from 50 to 300 parts by weight of an inert filler, (c) from 25 to 150 parts by weight of ground glass or specifically ground glass that is known as glass frits, (d) from 1 to 15 parts by weight of a silicate having the formula $R_a^1 Si(OR^2)_{4-a}$ and partial hydrolysis products thereof, where $R^1$ and $R^2$ are selected from monovalent hydrocarbon radicals and halogenated hydrocarbon radicals, and a is a whole number that is 0 or 1, and (e) from 0.1 to 0.5 parts by weight as a curing catalyst for the composition of a metal salt of a carboxylic acid varying from lead to manganese in the periodic table. In this composition, as well as in the case of the heat vulcanizable silicone rubber composition, there may be utilized as an additional flame insulative additive the glass fibers in the foregoing size range and, more preferably, milled glass fibers. Such compositions or room temperature vulcanizable silicone rubber compositions are cured by mixing at room temperature the one part which usually comprises the silanol end-stopped diorganopolysiloxane and the inert filler with the second part which usually comprises the alkyl silicate and the metal salt of a carboxylic acid. Both the heat vulcanizable silicone rubber composition and the room temperature vulcanizable silicone rubber composition can have the usual ingredients or additional flame insulative ingredients in the composition to enhance their effectiveness. One additive, that is, a flame insulative additive, which was found to degrade the flame insulative properties of the instant composition was platinum. It was found that the presence of platinum with glass frits in the composition did not improve the flame insulative properties of either the heat vulcanizable silicone rubber composition or the room temperature vulcanizable silicone rubber composition from such compositions having no special flame insulative additives or formulations.

DESCRIPTION OF THE PREFERRED EMBODIMENT

The linear diorganopolysiloxane polymer of a viscosity varying from 1,000,000 to 200,000,000 centipoise at 25° C., as pointed out above, may have organo groups selected from monovalent hydrocarbon radicals and halogenated monovalent hydrocarbon radicals. Accordingly, such organo groups may be selected from alkyl radicals of from 1 to 8 carbon atoms, alkenyl radicals, cycloalkyl radicals and mononuclear aryl radicals such radicals being, for instance, methyl, ethyl, propyl, vinyl, allyl, cyclohexyl, phenyl, methylphenyl, ethylphenyl and etc. As examples of halogenated monovalent hydrocarbon radicals, such halogenated monovalent hydrocarbon radicals may be selected from various chlorinated and fluorinated alkyl radicals and more preferably may be such fluorinated alkyl radicals such as, 3,3,3-trifluoropropyl. Accordingly, such a diorganopolysiloxane polymer has the formula, $$R_nSiO_{(4-n)/2}$$

where R is selected from the class consisting of alkyl radicals, aryl radicals, alkenyl radicals and fluoroalkyl radicals of up to 10 carbon atoms, n varies from 1.97 to 2.01. Most preferably, the substituent groups both in the above formula and as defined of a linear diorganopolysiloxane polymer are preferably selected from methyl, phenyl, vinyl and 3,3,3-trifluoropropyl radicals. Preferably, the linear diorganopolysiloxane polymer has some unsaturation in it and specifically from 0.1 to 1 mole percent vinyl substituent groups in the diorganopolysiloxane polymer. Also, such linear diorganopolysiloxane polymers may be either a single polymer specie or a blend of various linear diorganopolysiloxane polymers, however, substituted within the above definitions and with varying viscosities as long as the viscosity of the mixture is within 1,000,000 to 2000,000,000 centipoise at 25° C. Accordingly, it can also be envisioned in such blends that there may be utilized linear diorganopolysiloxanes of a viscosity below 1,000,000 centipoise at 25° C., so long as that blend or mixture of such linear diorganopolysiloxane polymer has a viscosity between 1,000,000 to 200,000,000 centipoise at 25° C.

It is also envisioned within the scope of the present invention to utilize a linear diorganopolysiloxane polymer of a viscosity or blends of linear diorganopolysiloxane polymers of a viscosity below 1,000,000 centipoise, such as, a viscosity between 500,000 centipoise and 1,000,000 centipoise at 25° C. However, such linear diorganopolysiloxane polymers or blends of polymers having a viscosity below 1,000,000 centipoise at 25° C. are not preferred since the cured polymer does not have the requisite physical properties. The procedure for producing such linear diorganopolysiloxane polymers is well known. Briefly, it comprises equilibrating cyclic polysiloxanes, whether trisiloxanes or tetrasiloxanes, in the presence of a small amount of an alkali metal hydroxide as a catalyst at elevated temperatures, that is, at temperatures between 100° to 250° C. until there is as much of the cyclic polysiloxanes being formed into a linear diorganopolysiloxane polymer as there is of the linear diorganopolysiloxane polymer being reconverted to cyclic polysiloxanes, such linear diorganopolysiloxane polymers being of the desired viscosity. To control the end viscosity of the mixture there is preferably added to such equilibration mixture the appropriate amount of chain stoppers such as, hexamethyldisiloxane, octamethyltrisiloxane, and etc. The amount of chain stoppers regulates the molecular weight of the linear diorganopolysiloxane polymers that are formed and as such determines the final viscosity of the linear diorganopolysiloxane polymers that are formed.

In the case of fluorinated polymers such fluorinated polymers can be prepared by the process set forth in the patent of John S. Razzano, U.S. Pat. No. 3,937,648. For more details as to the method of preparing such linear diorganopolysiloxanes, such methods are more fully explained in Glaister et al, U.S. Pat. No. 3,814,722, which is hereby incorporated into the present specification by reference.

In the present flame insulative composition set forth above, there must be 50 to 300 parts by weight of an inert filler. Preferably, such an inert filler is selected from fumed silica and precipitated silica (known in the silicone art as reinforcing fillers). However, up to 100% of the total inert filler may be comprised of extending fillers. There is preferably employed finely divided silica based fillers of the highly reinforcing type which are characterized by particle diameter of less than 50 millicrons and by surface areas of greater than 50 square meters per gram. The extending fillers of others than those preferred above may be selected from titanium dioxide, iron oxide, aluminum oxide, as well as the other inorganic materials known as inert fillers which can be included among others, diatomaceous earth, calcium carbonate and quartz and can preferably be employed in combination with highly reinforcing silica fillers to improve the tensile strength or the hardness of the elastomeric product. Other examples of suitable fillers are, diatomaceous silica, aluminum silicate, zinc oxide, zirconium silicate, barium sulfate, zinc sulfide, aluminum silicate and finely divided silica having surface bonded alkoxy groups.

As mentioned previously, up to 100% of such inert fillers should be of the extending type, preferably, the total filler for maximum structuring to impart flame insulative properties to the heat vulcanizable silicone rubber compositions of the instant case should be selected from fumed silica or precipitated silica. However, in certain instances part of such fillers, as stated previously, up to a maximum of 100% of the total filler may be any of the foregoing extending fillers.

The third necessary ingredient in the flame insulative heat vulcanizable silicone rubber compositions of the present case is from 25 to 150 parts by weight of ground glass and more preferably 50 to 100 parts, but a specific type of ground glass which is known as glass frits. Briefly, such glass frits and most preferably such glass frits or ground glass should have an average particle size varying from 50 microns to 400 microns. Although glass frits of a smaller size or a larger size can be utilized in the instant invention the most preferred glass frits utilized within the scope of the instant invention to produce the maximum structure flame insulative heat vulcanizable silicone rubber composition of the instant case is a glass frits having an average particle size within the above preferred range. By glass frits it is meant ground glass within the above particle size having a glass transition temperature between 1,000° and 1,400° F. It is within the scope of the instant invention to claim, as necessary, in the compositions of the instant case both heat vulcanizable silicone rubber compositions and room temperature vulcanizable silicone rubber compositions wherein the ground glass within the above particle size has the glass transition temperature as specified above, that is, a glass transition temperature between 1,000° to 1,400° F. As pointed out above, such a type of ground glass is usually known in the industry as glass frits. However, it may have other names and it is intended to specify as a critical ingredient in the flame insulative composition of the instant case ground glass within the above particle size having a glass transition temperature within the above ranges.

In one aspect of the instant case, the composition comprising the linear diorganopolysiloxane polymer, the inner filler and ground glass within the above particle size and glass transition temperature may be utilized in an uncured state as a flame insulative composition around cables, although in such situations it will be necessary to have some type of jacket to hold the composition in place. Although such uncured heat vulcanizable silicone rubber compositions are not the preferred insulative compositions of the instant case because of the need for a jacket to keep the uncured composition in place, nevertheless, for low flame insulative purposes or application where low flame insulative properties are desired such uncured heat vulcanizable silicone rubber compositions can be utilized with the necessary jacket.

In a more preferred aspect there is utilized to cure the above heat vulcanizable silicone rubber composition a peroxide curing catalyst and more generally from 0.1 to 8 parts by weight of a peroxide curing catalyst. Accordingly, these are all the necessary ingredients for the instant composition to provide a flame insulative heat vulcanizable silicone rubber composition which upon burning leaves a structured ash which is not blown away or easily removed and, thus, obviating the need for a jacket to hold the ash in place. As a result of this, the structured ash provides maximum flame insulative properties as against the flame and allows the electrical system to maintain its integrity for a maximum period of time. There may be added other well known ingredients to the instant heat vulcanizable composition either in preparing it so as to facilitate the process in mixing by the use of well known process aids, or also as additives to further improve the properties of the heat vulcanizable silicone rubber composition for certain applications. For instance, well known pigments may be added to the composition so that the cured heat vulcanizable silicone rubber composition will be within the proper color code.

There may also be employed in the present composition 1 to 25 percent and preferably 5 to 15 percent by weight based on the polydiorganosiloxane gum of a process aid for preventing the gum and the filler mixture from structuring prior to curing and after compounding. One example of such a process aid is a compound of the formula,

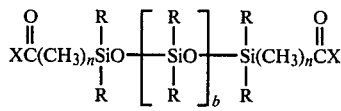

where R is a member selected from the class consisting of methyl and phenyl, X is a member selected from the class consisting of —OH, —NH$_2$ or —OR', where R' is methyl or ethyl, n has a value of from 2 to 4, inclusive, and b is a whole number equal to from 0 to 10, inclusive. Further details as to the properties, as well as the method of preparation of the compound of Formula (3), are to be be found in the disclosure of Martellock, U.S. Pat. No. 3,464,945 which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the gum of Formula (1). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. No. 2,954,357, which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosiloxane from one OH to 70 silicon atoms to two OH per silicon atom.

The hydroxylated siloxanes may be prepared by any suitable method, such as heating said siloxanes with steam under pressure at temperatures of about 120° C. or hydrolyzing silanes of the formula $R_nSiX_{4-n}$ where X is any hydrolyxable group such as Cl, OR, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclicaryl hydrocarbon radicals. Further, detailed information as to the hydroxylated organosiloxanes which may be used as process aids is to be found in Konkle et al, U.S. Pat. No. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

Other well known ingredients for heat vulcanizable silicone rubber compositions as set forth in the foregoing Glaister et al, U.S. Pat. No. 3,814,722, patent may be utilized in the instant composition as desired to lend to the cured composition the desired properties in accordance with a specific application.

For a maximum flame insulative effect it is desirable to also incorporate into the composition from 5 to 50, and preferably 5 to 30, parts by weight of glass fibers in addition to the ground glass (more commonly known as glass frits), more preferably at a concentration of 5 to 30 parts by weight of said glass fibers. Although more glass fibers than 50 parts can be added, the uncured composition becomes difficult to handle and the added glass fibers and such additional amount of fibers does not impart to the cured composition or uncured composition any additional flame insulative benefits, while if less than 5 parts of glass fibers are added the desired flame insulative effect is not obtained.

In the most preferred aspect of the instant invention for heat vulcanizable compositions or room temperature vulcanizable silicone rubber compositions, when the glass fibers are added to the composition for maximum flame insulative properties it is preferred that such glass fibers be milled glass fibers with a size varying from 0.01 to 0.5 inches. If the glass fibers are larger than 0.5 inches the desired structured ash of maximum flame insulative benefits is not obtained, and the materials become hard to process. If glass fibers of less than 0.01 inches are used, they do not markly add to the structureness of the burnt silicone ash that is formed. Accordingly, it is generally preferred that milled glass fibers be added, although any glass fibers may be added for some flame insulative effect in addition to the glass frits. It is generally preferred that such glass fibers have an average size, as stated previously, of between 0.01 to 0.5 inches and more preferably from 0.1 to 0.3 inches.

It should be pointed out that also within the general scope of the invention that the general range of fillers that may be added are 50 to 300 parts by weight per 100 parts of linear diorganopolysiloxane polymer, more preferably there may be utilized from 100 to 250 parts of an inert filler. In the preferred case, it is also desirable to add between 50 to 150 parts of the glass frits. However, it should be mentioned that both for room temperature vulcanizable silicone rubber compositions or heat vulcanizable silicone rubber compositions that the concept of the instant invention is the addition of glass frits in sizable quantities in addition to the inert filler to obtain maximum flame insulativeness or specific flame insulativeness for a specific cable or electrical system application. Accordingly, it is not applicant's intention to be bound by the above general and preferred ranges. In the same way, the use of glass fibers or the preferred milled glass fibers, for that matter, both in the use as well as the size of such milled glass fibers is optional, and such glass fibers do increase the flame insulativeness of the final composition. It can be categorically stated that the use of such preferred milled glass fibers in the instant composition will increase the flame insulativeness of the composition. However, the use of the milled glass fibers is optional unless maximum flame insulativeness in the heat vulcanizable silicone rubber composition or room temperature vulcanizable silicone rubber composition is desired. Again, as with the glass frits and the use of an inert filler, although ranges have been set above both for a general and preferred conditions for the amount and size of the milled glass fibers it is not applicant's intention to be bound by such ranges except to indicate them as preferred embodiments.

In addition to the foregoing ingredients to further increase the flame insulativeness of the heat vulcanizable silicone rubber composition or room temperature vulcanizable silicone rubber composition for maximum flame insulativeness there may be added from 5 to 30 parts of carbon black. However, as stated previously, such addition of carbon black is optional and is only to be added for specific applications.

It should be noted at this point that the addition of platinum as set forth in the foregoing Noble/Brower patent when added to the instant composition, in combination with the glass frits, retards rather than improves the flame insulativeness of the instant composition both in the case of heat vulcanizable silicone rubber compositions and room temperature vulcanizable silicone rubber compositions.

The ingredients that were applied above with respect to obtaining an improved heat vulcanizable silicone rubber composition also applies within the scope of the instant invention to improving flame insulativeness of two-part room temperature vulcanizable silicone rubber compositions. Such room temperature vulcanizable silicone rubber compositions comprise a silanol end-stopped diorganopolysiloxane polymer having a viscosity anywhere from 1,000 to 200,000 centipoise at 25° C. Such silanol stopped linear diorganopolysiloxane polymers are well known in the art as set forth in the Lampe and Bessmer, U.S. Pat. No. 3,888,815, which is hereby incorporated by reference. As pointed out in that patent, such linear silanol end-stopped diorganopolysiloxane polymers may be produced by various methods such as the equilibration of cyclicsiloxanes in the presence of a mild acid catalyst such as, sulfuric acid treated clay or toluene sulfonic acid with a proper amount of water in the composition or the equilibration of certain silicone hyrolyzates that are obtained by hydrolysis of diorganodichlorosilanes. Preferably, such silanol end-stopped diorganopolysiloxane polymer has the formula,

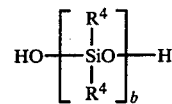

where $R^4$ is selected from the class consisting of alkyl radicals, aryl radicals, alkenyl radicals and fluorinated alkyl radicals of up to 10 carbon atoms, and b varies from 380 to 1000. The preparation of such silanol end-stopped diorganopolysiloxane polymers is more fully explained in the foregoing Bessmer and Lampe patent set forth above.

It must be specified that more broadly the organo groups of the linear silanol end-stopped diorganopolysiloxane polymer may be any of the organo groups set forth in the linear diorganopolysiloxane polymer mentioned above for preparing the heat vulcanizable silicone rubber compositions. However, more preferably, the organic groups are those as set forth above.

In addition to the silanol end-stopped diorganopolysiloxane polymer, such compositions would have the same amount of filler per 100 parts of such silanol end-stopped polymer, that is, from 50 to 300 parts by weight of an inert and more preferably from 100 to 250 parts by weight of inert filler. Such inert filler may be the same in concentration and definitions set forth for the heat vulcanizable silicone rubber composition. Again, such inert filler is preferably totally fumed silica or precipitated silica. There is generally present in the composition from 25 to 150 parts of ground glass and more preferably 50 to 100 parts of ground glass, such ground glass being the glass frits mentioned previously, having the glass transition temperature between 1,000° to 1,400° F. As explained previously, such ground glass, that is, ground glass known as glass frits, or known by some other name has a glass transition temperature between 1,000° and 1,400° F., and preferably an average particle size varying between 50 to 400 microns. The same limitations in quantity and type of the ground glass specified above for the heat vulcanizable silicone rubber composition applies also to room temperature vulcanizable silicone rubber compositions. Such two-part room temperature vulcanizable silicone rubber compositions are preferably stored with the one-part containing the linear silanol end-stopped diorganopolysiloxane and an inert filler, the second part comprising 1 to 15 parts per 100 parts of the linear silanol polymer of silicate having the formula,

and partial hydrolysis products thereof where $R^1$ and $R^2$ are selected from monovalent hydrocarbon radicals and halogenated monovalent hydrocarbon radicals and a is 0 or 1, again the $R^1$ and $R^2$ radicals may be any of the radicals set forth previously for the organo substituting groups for the linear diorganopolysiloxane polymer or silanol end-stopped polymer. Preferably the radicals are selected from the class consisting of alkyl radicals, alkenyl radicals, aryl radicals and fluoroalkyl radicals of up to 10 carbon atoms. More preferably, the silicate is a partial hydrolysis product of the compound set forth in the formula above. For more information as to the preparation and use of such silicate in two-part room temperature vulcanizable silicone rubber compositions one can refer to the Lampe and Bessmer patent which is hereby incorporated by reference. Accordingly, in the second part of such two-part room temperature vulcanizable silicone rubber compositions along with the silicate there is preferably present 0.01 to 5 parts by weight of a metal salt of carboxylic acid varying from lead to manganese in the periodic table. Although the metal salt if preferably of a monocarboxylic acid, both metal salts of monocarboxylic acid and dicarboxylic acids can be utilized in the room temperature vulcanizable silicone rubber composition of the instant case. The most preferred metal salts that may be utilized as catalysts with the composition of the instant case within the room temperature vulcanizable silicone rubber compositions in the instant case are tin salts and specifically dibutyl tin dilaurate. Other ingredients that may be added to the compositions, as is necessary, are pigments and the other usual ingredients as disclosed in the foregoing Lampe and Bessmer patent for the purpose of meeting the requirements of a particular electrical system. To cure the two-part room temperature vulcanizable silicone rubber composition of the instant case, the first part is mixed with the second part and the material is molded or formed into the desired shape or injected into desired cavities to be insulated and allowed to cure at room temperature—final curing taking place in 24 hours. Again to obtain maximum flame insulative properties in the two-part room temperature vulcanizable silicone rubber composition there may be present from 5 to 50 parts by weight of glass fibers and more preferably 5 to 30 parts by weight of glass fibers, and more specifically, milled glass fibers having an average length ranging from 0.01 to 0.5 inches in length; the preferred range of the milled glass fibers having the size of 0.1 to 0.3 inches in length. Glass fibers outside the above ranges and size may be utilized. Generally, it has been found that no additional benefits have been gained by exceeding the 50 parts by weight and if there is less than 5 parts by weight of glass fibers, the glass fibers do not add any flame insulative properties to the composition. As specified previously, within the broad range for the addition of glass frits to the two-part room temperature vulcanizable silicone rubber composition, as in the case of the heat vulcanizable silicone rubber composition, there is preferably added 50 to 100 parts of glass frits, preferably such glass frits having a size average particle size ranging from 50 to 400 microns in size. Finally, as with the heat vulcanizable silicone rubber composition, for certain additional flame insulative properties there may be added to the instant composition 5 to 30 parts of carbon black. Preferably, it must be pointed out, as stated previously, although the above particle size has been given for the glass frits or ground glass both in the heat vulcanizable silicone rubber composition and the room temperature vulcanizable silicone rubber composition, such ranges are general guides. Preferably the only requirement in the use of the ground glass being the use of glass frits, that is, ground glass having glass transition temperatures between 1,000° to 1,400° F. As far as the broad and preferred ranges for the inert filler and the glass frits in the heat vulcanizable silicone rubber composition and the room temperature vulcanizable rubber composition, the ranges are general ranges to be used as guides. It can be appreciated that the amount of the flame insulative additives that will be utilized in a specific composition will be the values that give a particular flame insulativeness or a structured silicone ash for a particular application. In addition, the uses of milled glass fibers are optional and would only be necessary to obtain maximum flame insulativeness for the insulation and protection of certain electrical systems. This is the case with the addition of the carbon black which has been found necessary in certain applications. However, again with respect to the concentrations of such carbon black and glass fibers the concentrations given in the instant application are given as guides and the particular concentrations for a specific application to protect a particular system would be determined by the flame insulative properties desired for that particular electrical system. The critical aspect of the present invention lies in the utilization of glass frits, that is, ground glass, at the concentration set forth above to produce a heat or room temperature vulcanizable silicone rubber system which will protect and impart the desirable flame insulativeness to an electrical system so that as a result when the silicone system burns it will form a structured white ash which provides maximum protection to the electrical system. To improve such properties it is also disclosed in the instant case that glass fibers in certain generally preferred quantities may be added as well as the additional use of carbon black.

The foregoing examples are given for the purpose of illustrating the conception and reduction to practice of the instant invention. They are not given for any purpose in limiting or interpreting the scope of the instant patent application and claims thereto. All parts are by weight.

EXAMPLE 1

There was prepared an uncured heat vulcanizable silicone composition comprising the foregoing parts set forth in the table below comprising a vinyl-terminated diorganopolysiloxane polymer of 10,000,000 viscosity having an 0.2 mole percent vinyl content, containing the quantity set forth below of 5 micron size of ground silica, the quantity set forth below of fumed silica and the quantity set forth in Table I below of glass frits.

TABLE I

|  | I | II | III | IV |
| --- | --- | --- | --- | --- |
| Vinyl-containing dimethyl-polysiloxane | 100 | 100 | 100 | 100 |
| 5 micron ground silica | 120 | 140 | 120 | 140 |
| Fumed silica | 4 | 4 | 4 | 4 |
| Glass frits | 50 | 50 | 75 | 75 |

The foregoing compositions were utilized as valley sealants for cable, that is, a non-cured sealant, that was forced into the voids of the cable which was wound by Mylar tape and had a jacket made of polyvinylchloride material. In every case the above compositions were evaluated by placing them in a muffle furnace, heating to 1400° F., and allowing the mass to cool to room temperature and visibly inspecting the ash. In every case the ash was highly structured and was not easily movable.

EXAMPLE 2

There was prepared various two-part room temperature vulcanizable silicone rubber compositions having the ingredients set forth in Table II below having the amount of the ingredients as set forth in Table II below, such systems comprising 100 parts of a terminated dimethylpolysiloxane polymer of 2000–3000 centipoise and which contained 285 parts of 10 micron ground silica and 15 parts of titanium oxide which shall be known hereinafter as Mixture "A". There was also prepared a mixture comprising 100 parts of a silanol end-stopped dimethylpolysiloxane polymer of 30,000 centipoise viscosity at 25° C., which contained 326 parts of ground quartz, 6 parts of ethylorthosilicate, 0.6 parts of dibutyl tin dilaurate and green pigment, which shall be known as Mixture "B" in Table II below. There was prepared a mixture referred to in Table II below as Mixture "C" comprising 100 parts of a silanol-terminated dimethylpolysiloxane of 3000 centipoise at 25° C., 326 parts of ground quartz, 18 parts of partially hydrolyzed ethylorthosilicate, 1.7 parts of dibutyl tin dilaurate. These two-part room temperature vulcanizable silicone rubber compositions were mixed in the amounts of glass frits shown in Table II below (all parts in such tables both in this Example and the prior Example being by weight). In every case the products of Table I were evaluated after the composition was finally cured by placing them in a muffle furnace, heating them to 1400° F., allowing the mass to cool to room temperature, and visibly inspecting the ash. In every case the ash was highly structured.

TABLE II

|  | V | VI | VII | VIII |
|---|---|---|---|---|
| Mixture A | 50 | 50 | 80 | 80 |
| Mixture B | 50 | 50 | — | — |
| Mixture C | — | — | 20 | 20 |
| Glass Frits | 5 | 10 | 5 | 7.5 |

I claim:

1. A flame insulative room temperature vulcanizable silicone rubber composition comprising (a) 100 parts by weight of silanol end-stopped diorganopolysiloxane having a viscosity varying from 1,000 to 200,000 centipoise viscosity at 25° C.; (b) from 50 to 300 parts by weight of an inert filler selected from the class consisting of fumed silica and precipitated silica; (c) from 25 to 150 parts by weight of glass frits; (d) from 1 to 15 parts by weight of a silicate having the formula,

and partial hydrolysis products thereof, where $R^1$ and $R^2$ are selected from monovalent hydrocarbon radicals and halogenated monovalent hydrocarbon radicals, a is 0 or 1, and (e) from 0.01 to 5 parts by weight of the metal salt of a carboxylic acid the metal varying from lead to manganese in the Periodic Table.

2. The composition of claim 1 wherein the silanol end-stopped diorganopolysiloxane has the formula,

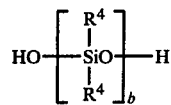

where $R^4$ is selected from the class consisting of alkyl radicals, aryl radicals, alkenyl radicals and fluorinated alkyl radicals of up to 10 carbon atoms and b varies from 380 to 2,000.

3. The composition of claim 1 wherein there is further present from 5 to 50 parts by weight of glass fibers.

4. The composition of claim 3 wherein said glass fibers are present at a concentration of 5 to 30 parts by weight and are milled glass fibers having an average size varying from 0.01 to 0.5 inches.

5. The composition of claim 4 wherein said glass frits has a size varying from 50 microns to 400 microns.

6. The composition of claim 5 wherein the amount of said glass frits varies from 50 to 100 parts by weight.

7. The composition of claim 6 wherein there is present from 5 to 10 parts of carbon black.

8. The composition of claim 1 wherein said inert filler is selected from the class consisting of ground silica, fumed silica and precipitated silica.

9. A process for forming a flame insulative room temperature vulcanizable silicone rubber composition comprising mixing at room temperature in the presence of ambient moisture (a) 100 parts by weight of a silanol end-stopped diorganopolysiloxane having a viscosity varying from 1,000 to 200,000 centipoise at 25° C., where the organo groups are selected from the class of monovalent hydrocarbon radicals and halogenated monovalent hydrocarbon radicals; (b) from 50 to 300 parts by weight of an inert filler selected from the class consisting of fumed silica and precipitated silica; (c) from 25 to 150 parts by weight of glass frits; (d) from 1 to 15 parts by weight of a silicate having the formula,

and partial hydrolysis products thereof where $R^1$ and $R^2$ are selected from monovalent hydrocarbon radicals and halogenated monovalent hydrocarbon radicals, a is 0 or 1 and (e) from 0.01 to 5 parts by weight of the metal salt or a carboxylic acid the metal varying from lead to manganese in the Periodic Table.

* * * * *